US007404302B2

(12) United States Patent
Balakrishnan et al.

(10) Patent No.: US 7,404,302 B2
(45) Date of Patent: Jul. 29, 2008

(54) METHOD OF DEPOSITING GLASS SOOT

(75) Inventors: Jitendra Balakrishnan, Ithaca, NY (US); Steven A Dunwoody, Castle Hayne, NC (US); Pushkar Tandon, Corning, NY (US)

(73) Assignee: Corning Incorporated, Corning, NY (US)

( * ) Notice: Subject to any disclaimer, the term of this patent is extended or adjusted under 35 U.S.C. 154(b) by 638 days.

(21) Appl. No.: 10/857,081

(22) Filed: May 27, 2004

(65) Prior Publication Data

US 2005/0262877 A1 Dec. 1, 2005

(51) Int. Cl.
C03B 37/012 (2006.01)
(52) U.S. Cl. .............................. 65/421; 65/422; 65/426; 65/427
(58) Field of Classification Search .................... 65/421, 65/422, 426
See application file for complete search history.

(56) References Cited

U.S. PATENT DOCUMENTS

| 3,932,162 | A | * | 1/1976 | Blankenship | 65/421 |
| 4,564,378 | A | * | 1/1986 | Kuisl | 65/422 |
| 4,599,098 | A | * | 7/1986 | Sarkar | 65/421 |
| 4,618,354 | A | | 10/1986 | Suda et al. | 65/2 |
| 4,627,867 | A | | 12/1986 | Tanaka et al. | 65/3.12 |
| 4,731,103 | A | | 3/1988 | Mizutani et al. | 65/312 |
| 4,765,815 | A | | 8/1988 | Danzuka et al. | 65/3.12 |
| 4,801,322 | A | | 1/1989 | Suda et al. | 65/144 |
| 6,324,871 | B1 | | 12/2001 | Nakamura et al. | 65/421 |
| 6,546,757 | B1 | | 4/2003 | Morse | 65/377 |
| 6,988,379 | B2 | * | 1/2006 | Orcel et al. | 65/391 |
| 2003/0024273 | A1 | | 2/2003 | Ishihara | 65/382 |
| 2003/0101770 | A1 | | 6/2003 | Nakamura et al. | 65/382 |
| 2003/0101772 | A1 | * | 6/2003 | Itoh et al. | 65/421 |
| 2003/0110811 | A1 | * | 6/2003 | Nunome et al. | 65/421 |
| 2003/0140659 | A1 | * | 7/2003 | Fabian | 65/412 |
| 2003/0209038 | A1 | | 11/2003 | Jablonowski et al. | 65/382 |
| 2003/0233849 | A1 | | 12/2003 | Shimada et al. | 65/382 |
| 2004/0007025 | A1 | | 1/2004 | Gotoh et al. | 65/384 |
| 2005/0092030 | A1 | * | 5/2005 | Balakrishnan et al. | 65/421 |

FOREIGN PATENT DOCUMENTS

| JP | 09086948 | 3/1997 |
| JP | 2000169175 | 6/2000 |
| JP | 2003313043 | 6/2003 |
| WO | WO 03/070652 | 8/2003 |
| WO | WO 2004/035495 | 4/2004 |

* cited by examiner

*Primary Examiner*—Steven P. Griffin
*Assistant Examiner*—Russell J Kemmerle, III
(74) *Attorney, Agent, or Firm*—Kevin M. Able

(57) ABSTRACT

A method for deposition glass soot for making an optical fiber preform. A fuel and a glass precursor are flowed to a burner flame forming glass soot which is deposited onto a glass target. By first depositing an insulating layer of glass soot with a low velocity burner flame, the amount of water which may be adsorbed into the surface of the glass target can be reduced. Thereafter, the flame velocity may be increased to increase the deposition rate of the glass soot without significantly increasing the concentration of water incorporated into the glass target.

20 Claims, 5 Drawing Sheets

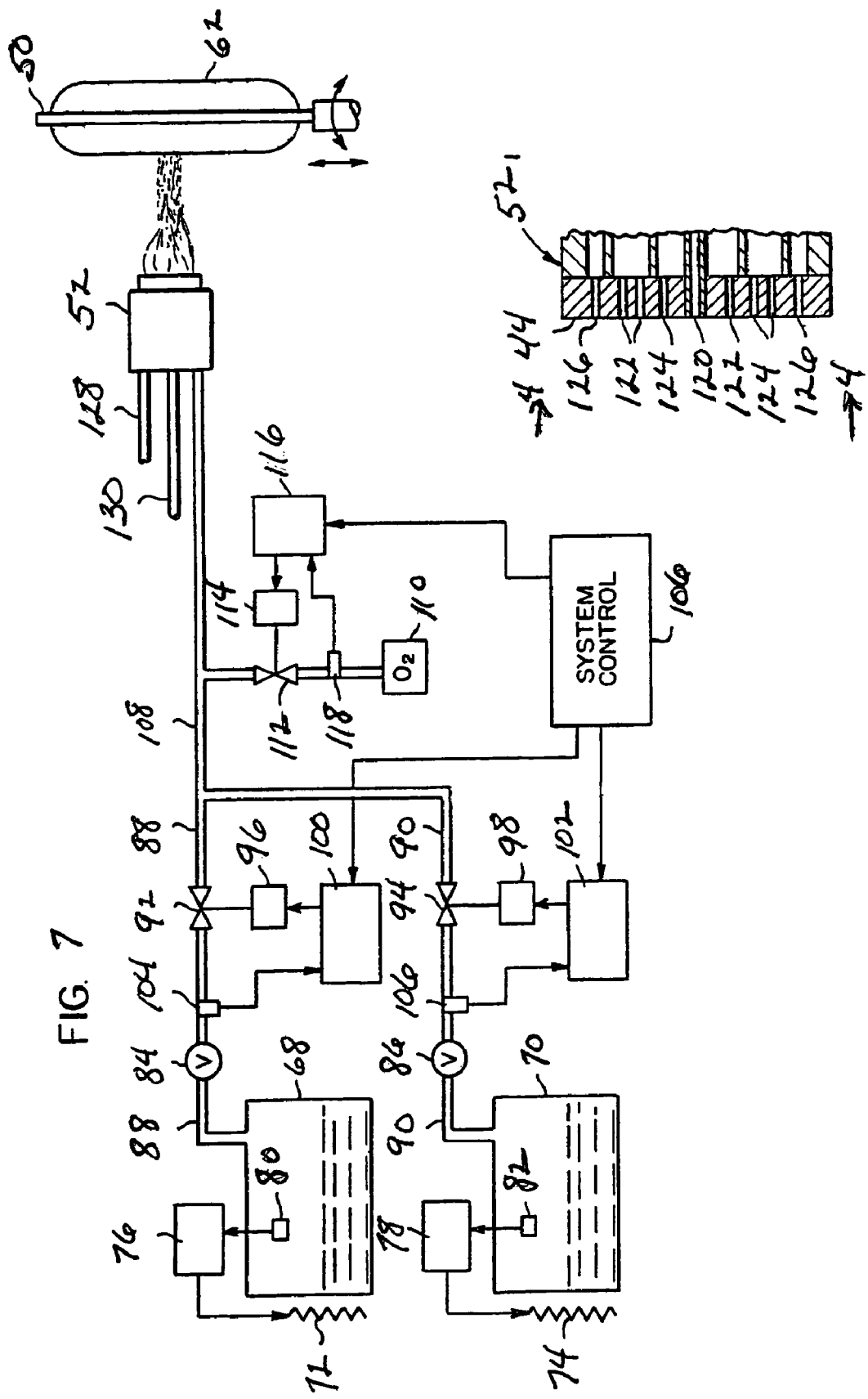

METHOD OF DEPOSITING GLASS SOOT

BACKGROUND OF THE INVENTION

1. Field of the Invention

The present invention relates to a method of depositing glass soot to form an optical fiber preform, and more particularly a method of varying the flame velocity of a glass soot depositing burner.

2. Technical Background

Water in an optical fiber is a source of undesirable attenuation of a light signal propagating along the fiber. Water as used here includes $H_2O$, OH, or H molecules. The silica ($SiO_2$) can react with one of the above forms of water ($H_2O$, OH, or H) to form SiOH which absorbs light strongly at 1380 nm and causes the aforementioned attenuation. The SiOH group in the optical fiber may degrade not only the attenuation performance of optical fibers operating in the 1310 nm window, but may also increase the attenuation of optical fibers operating at wavelengths as long as 1550 nm.

Prior attempts to remove water from the optical fiber include drying soot regions of the optical fiber preform with a halide gas (such as Cl gas, for example) prior to consolidating the preform and drawing the optical fiber from the consolidated preform. Typically, the aforementioned drying takes place at temperatures of about 800-1200° C. The halide gas may be exposed to both an outer surface of the preform as well as a soot centerline of the preform.

However, in the course of manufacturing segmented core fibers using multi-step processes, the aforementioned drying process in some circumstances may be insufficient to reduce the SiOH concentration in the consolidated glass regions of the preform to an acceptable level.

In a modern conventional optical fiber manufacturing process, such as an outside vapor deposition process (OVD), optical fiber may be manufactured by first forming a core cane. By core cane what is meant is a solid glass rod which is an optical fiber precursor comprising at least a portion of the core glass for an optical fiber which may eventually be drawn from the core cane. In some cases the core cane may further comprise at least a portion of the cladding glass for such an optical fiber. In subsequent steps, additional glass is formed on the core cane to form a draw preform. Such additional glass may comprise additional core glass, cladding glass, or both core and cladding glass. The draw preform may then be drawn into an optical fiber. A multi-step manufacturing process advantageously provides significant manufacturing flexibility, as a core cane may form the basis for multiple optical fiber designs and is easily stored for subsequent use, as needed. In a multi-step process, one or more additional layers of glass may be formed on a core cane in one or more steps. The additional glass may be formed on the core cane by heating and collapsing one or more glass tubes over the core cane (sleeving), by depositing glass soot (deposition) onto the core cane and heating and consolidating the glass soot, or both sleeving and deposition/consolidation. As previously stated, the additional glass may include additional core glass, cladding glass, or both core and cladding glass.

When deposition is used to add glass within or adjacent to the core region of an optical fiber preform, the additional layers of soot may form multiple core segments. The refractive index of the segments may vary within each segment, or the refractive index may vary from one segment to another segment. A multi-step process, such as the one described supra, is particularly well-suited to the manufacture of such segmented core optical fibers, and is described in U.S. Pat. No. 4,453,961.

Rewetting of the core region of an optical fiber preform is a significant consideration in the manufacture of low loss optical fibers when employing the combustion of a hydrogen-containing fuel during the deposition process. Rewetting is an especially troublesome issue for the manufacture of optical fibers manufactured with a multi-step process, including, but not limited to, segmented core optical fibers. By multi-step process what is meant is a process of manufacturing an optical fiber preform wherein a glass rod, or core cane, is first made by a conventional process, and which core cane may serve as the target rod for a subsequent deposition of glass soot to form either a next segment of the core, or, optionally, cladding soot may be deposited onto the core cane. Because the predominant portion of the optical power propagating in a single mode optical fiber travels within the core region of the optical fiber, and the distribution of that power is heavily weighted toward the center of the core region, rewetting of the initial glass core rod may significantly affect the attenuation of the optical fiber by placing a high concentration of water in the region of the optical fiber having a high optical power level. Rewetting of the core cane by the deposition of glass soot onto the core cane may lead to a significant increase in optical loss of the resultant optical fiber. To minimize optical loss, or attenuation, in an optical fiber it is preferred that the amount of OH adsorbed into the surface of the glass core cane is minimized. The OH content of the glass may be characterized by measuring OH concentration at a plurality of locations across the radius of a glass rod using Fourier Transform Infrared Spectroscopy (FTIR). The measurement of OH concentration in glass by FTIR is well known. It should be noted that the impact of OH content in the optical fiber is a function not only of the peak amount of OH present at the glass surface, or interface, but also the radial extent of the OH concentration. To that end, as used hereinafter, the term surface, or interface shall mean a region extending about 100 μm from the outermost surface of the glass target, or core cane.

Surprisingly, although the concentration of water vapor at the glass-soot interface during the deposition of soot onto the glass rod may be significant, it is the temperature at the glass surface that exerts the greatest influence over the amount of water adsorbed into the glass. Thus, controlling the glass surface temperature becomes a principal consideration during the deposition process. It has also been discovered by the inventors herein that, due to the low thermal conductivity of glass soot, a relatively thin layer of glass soot deposited on the surface of the core cane is capable of insulating the core cane, thereby reducing the surface temperature of the core cane and limiting the adsorption rate of water into the core cane.

One method that may be employed to decrease the manufacturing cost of an optical fiber preform is to increase the deposition rate of glass soot. Achieving an increased deposition rate has lead to widespread use of multiple soot-producing burners. Although the use of multiple burners to deposit glass soot has produced the desired increases in deposition rates, the high temperature produced at the surface of the glass core cane may undesirably increase the amount of water adsorbed into the glass. Single burner deposition, although typically employing a similar flame temperature as multiple burner deposition, tends to produce a lower surface temperature than multiple-burner deposition. As a single burner flame traverses the length of a glass rod, the localized surface of the rod adjacent the burner flame experiences a period of time between passes of the flame where it cools. The cooling reduces the adsorption of water into the surface of the core cane. The reciprocating relative motion between the burner and the core cane produces a periodic heating and cooling cycle which forms an envelope representing the overall temperature of the glass rod as a function of time. The temperature envelope for a single burner deposition process is typically lower than the temperature envelope for a multiple burner deposition process.

It has previously been assumed that a significant source of water in an optical fiber resulting from a multi-step manufacturing process such as the one described supra, wherein one or more layers of glass soot are deposited onto a glass core cane, originated from incomplete drying of the soot regions of the composite optical fiber preform during subsequent steps to dry and consolidate the preform. It was believed that this residual water migrated to the core region of the preform during the consolidation heat treatment. However, it has been discovered by the inventors herein that a significant source of water which is incorporated into the glass core cane during the subsequent deposition of glass soot originates from the oxidation of the hydrogen-based fuels typically used to hydrolyze the glass soot precursors. The water thus formed may then be deposited on the surface of the core cane. Moreover, the inventors herein have also discovered that adsorption of water into the core cane, resulting in rewetting of the core cane, is dependent upon certain process parameters during the deposition of soot onto the core cane. In particular, the localized temperature of various regions of the core cane and the time during which these localized regions are at a specific temperature play an important part in the amount of water which may be adsorbed. Water which may be adsorbed into the core cane in this manner may not be adequately removed from the preform during drying or consolidation of the preform, and may therefore remain in the drawn optical fiber. The adsorbed water may react with silica to form SiOH, which has a broadband absorption at about 1380 nm, and which in turn may result in an increased attenuation in an operating wavelength range, or window, used within the telecommunication industry.

SUMMARY

In one broad aspect of the invention, a method of depositing glass soot is proposed comprising flowing a fuel and a glass precursor to a burner flame at a total mass flow rate to form a glass soot, the total mass flow rate being a sum of a mass flow rate of the fuel and a mass flow rate of the glass precursor, depositing a first layer of glass soot on a core cane at a first total mass flow rate, depositing a second layer of glass soot overtop the first layer of glass soot at a second total mass flow rate to form an optical fiber precursor; and wherein the second total mass flow rate is greater than the first total mass flow rate.

In one embodiment, a thickness of the first layer of glass soot is preferably less than about 20 mm, more preferably less than about 10 mm. Preferably, a temperature at an interface between the core cane and the first layer of glass soot does not exceed about 900K (627° C.), more preferably the interface between the core cane and the first layer of glass soot does not exceed about 800K (527° C.).

In another broad aspect of the invention, a method of making an optical fiber preform is disclosed comprising forming a glass soot in a burner flame, the burner flame having a flame velocity, depositing a first layer of glass soot on a core cane at a first flame velocity, depositing a second layer of glass soot overtop the first layer of glass soot at a second flame velocity to form an optical fiber precursor, and wherein the second flame velocity is greater than the first flame velocity.

In an embodiment, a thickness of the first layer of glass soot is less than about 20 mm, more preferably less than about 10 mm. Preferably, a temperature at an interface between the first glass soot layer and the core cane does not exceed about 900K (627° C.), more preferably the interface does not exceed about 800K (527° C.). The first flame velocity is preferably less than about 12 m/s, more preferably less than about 5 m/s. The second flame velocity is preferably greater than about 12 m/s. In another embodiment, a plurality of burner flames is used comprising a first burner flame having the first flame velocity and a second burner flame having the second flame velocity. Depositing the second layer of glass soot may comprise increasing a total mass flow rate of reactants to the burner flame. When the optical fiber precursor has been consolidated to form an optical fiber preform, the optical fiber preform preferably comprises less than about 0.1 ppm OH. An optical fiber drawn from the optical fiber precursor preferably comprises less than about 0.1 ppm OH.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

BRIEF DESCRIPTION OF THE DRAWINGS

FIG. 7 is a schematic diagram of a conventional apparatus for depositing glass soot via outside vapor deposition.

FIG. 8 is a longitudinal cross sectional view of a portion of a burner for depositing glass soot.

DETAILED DESCRIPTION

Figure 1:
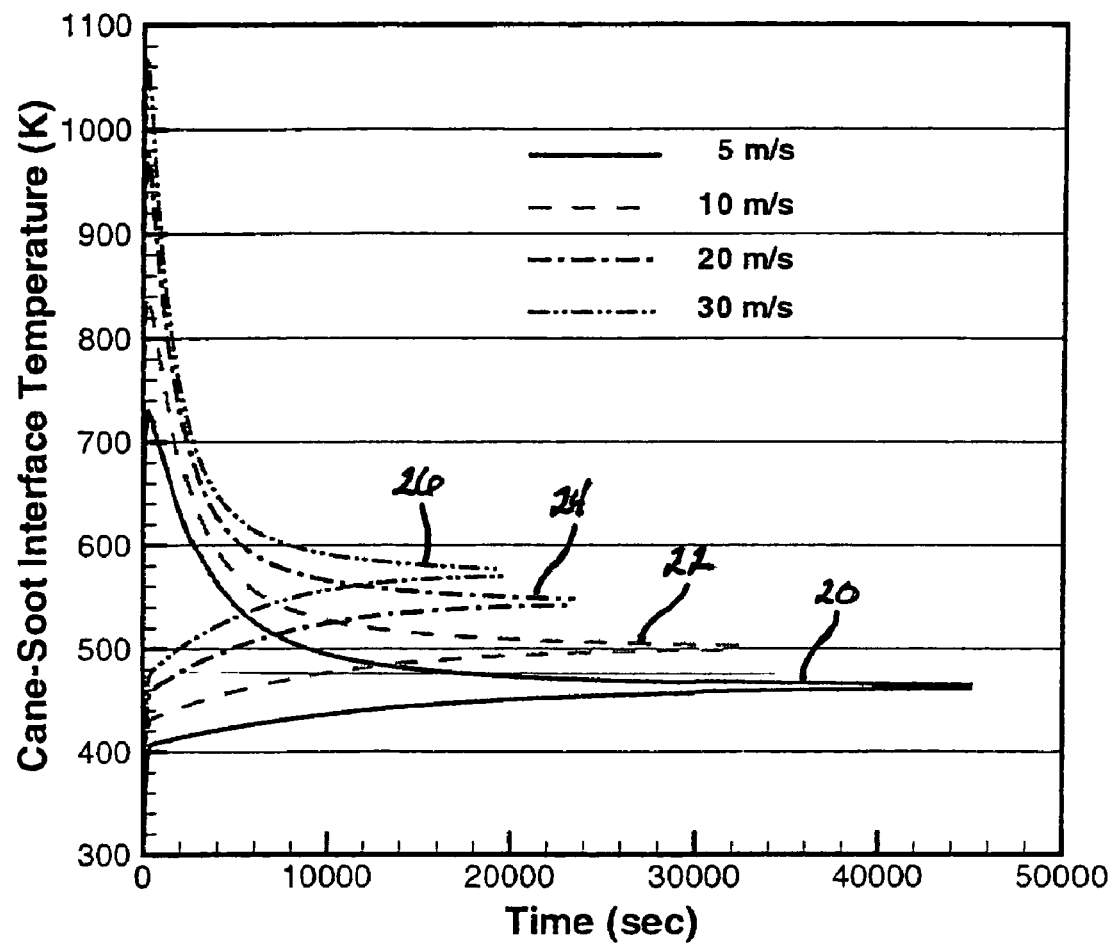
FIG. 1 is a graph of calculated core cane-soot interface temperatures as a function of time for four different burner flame velocities.

The inventors herein have discovered that the amount of water which may diffuse into a glass target, such as an optical fiber core cane, during the deposition of glass soot from a soot depositing burner is dependent upon amount of water deposited by the burner at the glass target-soot interface, the surface temperature of the glass target surface and the concentration of water present. The glass surface may be considered as that region of the glass target extending to a depth of about 100 μm from the boundary between the solid glass of the target and the deposited soot. The temperature of the glass surface at the glass-soot interface may be affected, inter alia, by the velocity of the burner flame in a direction perpendicular to the burner face. FIG. 1 shows the calculated temperature envelopes for a cylindrical glass target surface as a result of varying burner flame velocities. Four examples are shown: 5 n/s (20), 10 m/s (22), 20 m/s (24) and 30 m/s (26). The burner flame is assumed to be reciprocally traversing the glass surface at a rate of 60 seconds per cycle (that is, the time it takes for the burner to return to a given position). The envelope is formed as a consequence of the heating and cooling cycle undergone by the glass target surface as the burner flame passes and returns to a given position along the glass surface.

As shown by FIG. 1, the maximum temperature at any given point along any one of the four envelopes decreases as glass soot is deposited. As the thickness of the glass soot increases, that is, as the deposition process progresses over time, the amount of heat which is transferred from the burner flame to the surface of the glass target is reduced. FIG. 1 also shows that as the burner flame velocity increases, so too does the deposition rate, as evidenced by the time required to deposit identical amounts of soot, the 30 m/s flame having completed the deposition in approximately 20,000 seconds versus about 40,000 seconds for the 5 m/s flame. Nevertheless, as the flame velocity increases, the surface temperature of the target also increases. For example, the maximum surface temperature of the glass surface for a flame velocity of 5 m/s is calculated to be only about 730K, whereas the maximum surface temperature of the glass surface for a flame velocity of 30 m/s is calculated to be nearly 1070K.

It is desirable from a manufacturing perspective to achieve a high overall deposition rate. However, it is also desirable that the amount of OH which is contained within the resultant glass is minimized to ensure low attenuation in the final optical fiber.

Figure 2:
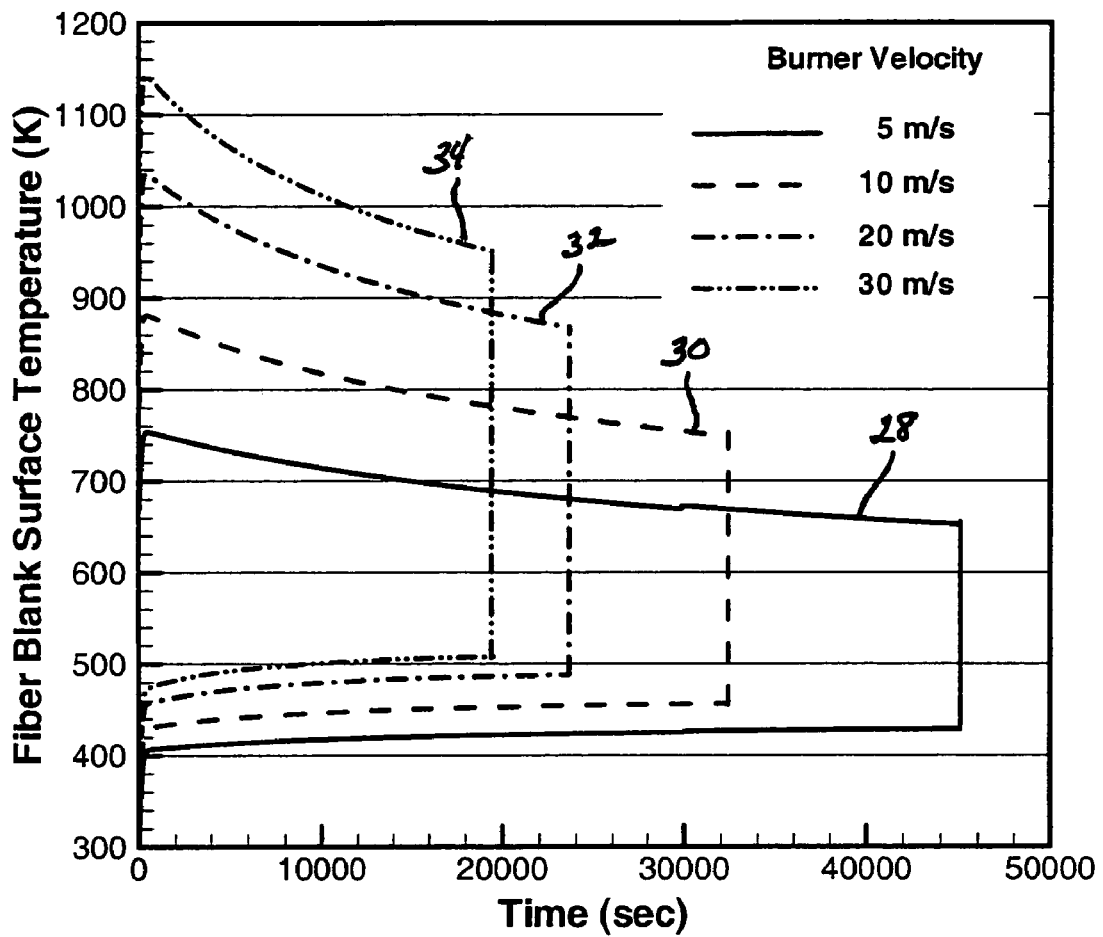
FIG. 2 is a graph of calculated soot preform surface temperatures as a function of time for four different burner flame velocities corresponding to the interface temperatures of FIG. 1.
Figure 3:
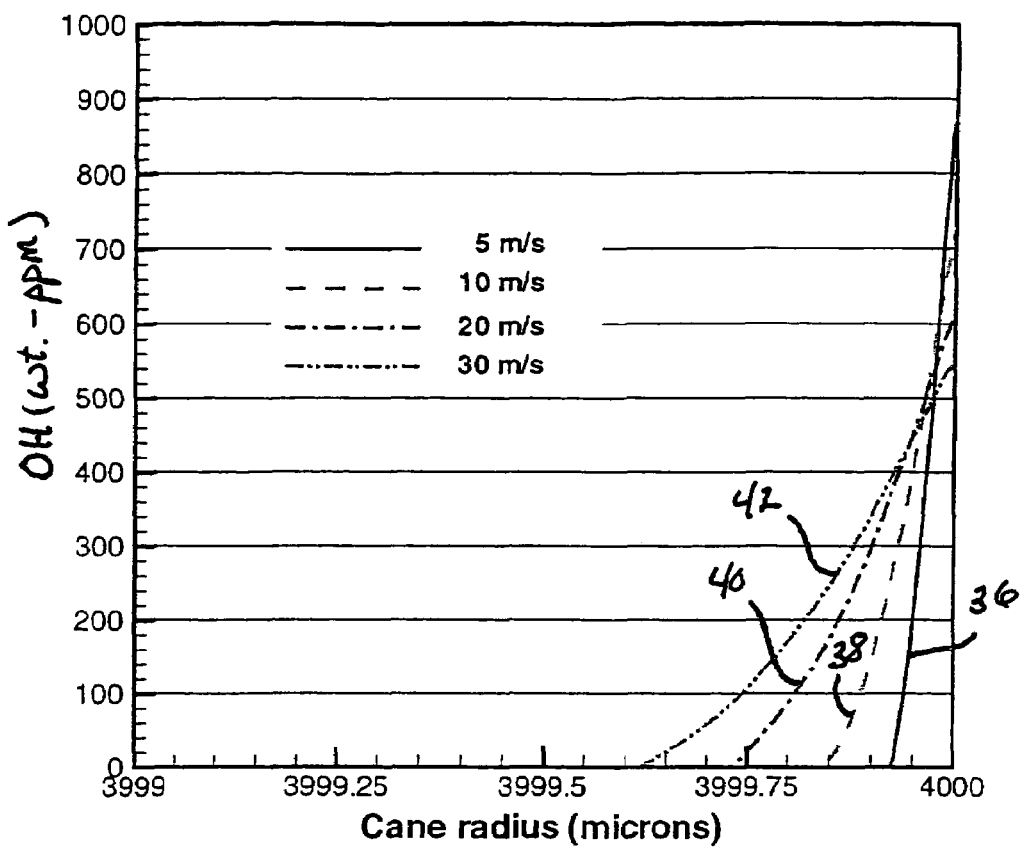
FIG. 3 is a graph of calculated OH concentrations in wt. ppm as a function of radius for four different burner flame velocities corresponding to FIGS. 1 and 2.

FIG. 2 illustrates the calculated surface temperature envelope of the porous soot blank, or preform, of FIGS. 1 and 2, and may be used in contrast with FIG. 1 to show how the surface temperature of the soot relates to the temperature at the surface of the glass target, e.g. the core cane-soot interface. As in FIG. 1, each curve in FIG. 2 represents the temperature of the soot surface as the burner flame traverses the surface, thus each curve forms an envelope which depicts the heating and cooling of the surface as the flame traverses the preform. In FIG. 2, curve 28 represents the temperature related to a burner flame velocity of 5 m/s, 30 for a velocity of 10 m/s, 32 for a velocity of 20 m/s and 34 for a velocity of 30 m/s The amount of OH calculated to be radially adsorbed into the surface of the glass target of FIGS. 1, 2 as a function of flame velocity is illustrated in FIG. 3. That is, curve 36 represents the amount of OH calculated to be adsorbed into the surface of the core cane for a flame velocity of 5 m/s, 38 for 10 m/s, 40 for 20 m/s and 42 for 30 m/s. The burner conditions were assumed to be equivalent to the conditions described supra (e.g. 60 seconds/cycle). The glass target surface as depicted in FIG. 3 is the far right axis of the graph—a radius of 4000 µm. Flame velocity as used throughout this disclosure is defined as the total mass flow rate $m_t$ of the constituent elements, or reactants, flowing to the burner flame divided by the total cross sectional area at of the nozzles at the burner face through which the various constituent reactants flow. FIG. 3 shows that as the flame velocity decreases, the amount of water adsorbed into the glass surface also decreases. Thus, to summarize FIG. 1-3, although a high flame velocity may result in a faster deposition process, a reduction in flame velocity for a soot depositing burner may result in a reduced surface temperature for the deposition surface and thus a reduction in the amount of water adsorbed into the deposition surface. If a layer of insulating glass soot is first deposited on the glass target at a low flame velocity and therefore a low surface temperature, the amount of water (i.e. OH) which may be adsorbed into the glass target can be significantly reduced. Flame velocity, and therefore deposition rate, may thereafter be increased to increase the deposition rate without significantly increasing the surface temperature at the glass-soot interface and the amount of water adsorbed into the glass target.

Figure 4:
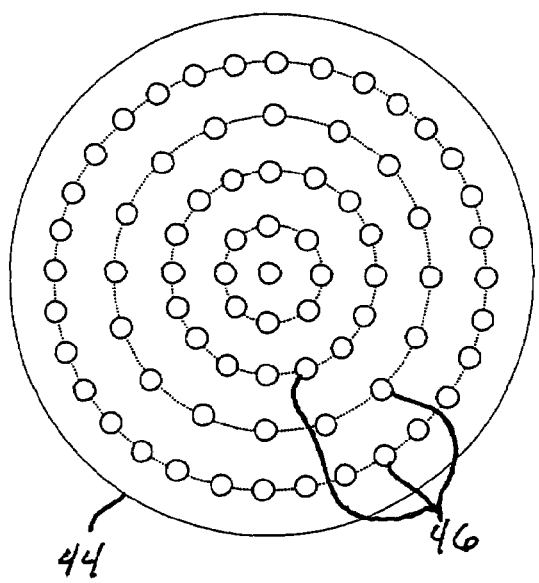
FIG. 4 is a top down view of an exemplary soot depositing burner face showing concentric rings of nozzles.

FIG. 4 is an illustration of exemplary burner face 44. Burner face 44 shows multiple nozzles, generally indicated by reference numeral 46, arranged in concentric rings. Each ring of nozzles in the exemplary burner face of FIG. 4 may pass a different reactant. For example, one set of nozzles may have only a single gas flowing through the nozzles, such as oxygen, at one mass flow rate $m_1$. Other nozzles may have, for example, a mixture of a fuel gas and oxygen flowing through the nozzles at a mass flow rate of $m_2$. Still other nozzles may have one or more glass precursors flowing through the nozzles at mass flow rate $m_3$. The total mass flow rate flowing to the burner flame is the sum of the individual mass flow rates of each nozzle, e.g. $m_t = m_1 + m_2 + m_3 + \ldots$ Each nozzle has a certain cross sectional area, and the cumulative, or total cross sectional area of all the nozzles comprises the total nozzle cross sectional area of the burner. Although the burner face depicted in FIG. 4 illustrates nozzles grouped in rings, other nozzle designs are within the scope of the invention and FIG. 4 should not be considered limiting in this regard. For example, the burner nozzles may comprise concentric annular nozzles.

As demonstrated by FIGS. 1-3, the temperature of the glass target surface, and therefore the amount of water adsorbed into the glass target surface, may be increased or decreased by varying the flame velocity of the soot depositing burner. FIGS. 1-3 also show that the surface temperature of the glass target for a given flame velocity is reduced as the thickness of insulating glass soot increases. Deposition of an insulating layer of glass soot may therefore prevent the surface of the glass target from adsorbing excess water by limiting the surface temperature of the glass target. The inventors herein have discovered that if an insulating layer of glass soot can be deposited at a low flame velocity, and therefore at a low glass target surface temperature, the amount of water adsorbed into the glass target, and thus the water-induced optical loss of the final optical fiber, can be minimized. Once the insulating glass soot layer has reached a predetermined thickness the flame velocity may be increased to increase the glass soot deposition rate without significantly increasing the glass target surface temperature.

The velocity of the burner flame may be varied according to a variety of methods. The velocity of the burner flame may be varied, for example, by changing the geometry of the burner such as by changing the cross sectional area of the individual burner nozzles at the burner face. This may effectively be accomplished, for example, by using a first burner having a first predetermined total nozzle area to deposit a first, insulating layer of glass soot, and thereafter employing a second burner having a second, predetermined total nozzle area different from the first total nozzle area to deposit subsequent layers of glass soot. Preferably, the total nozzle area of the second burner is less than the total nozzle area of the first burner. Assuming an equal mass flow rate of reactants (e.g. oxygen, fuel and glass precursors) flowing through each burner, a reduced total nozzle area may result in an increased flame velocity. That is, for a first burner having a first total nozzle area (which is the sum of the individual nozzle areas) and therefore a first burner flame velocity for a given total mass flow rate, a second burner having a total nozzle area less than the total nozzle area of the first burner for the same total mass flow rate would have an increased flame velocity. This may be accomplished by decreasing the number of individual nozzles on the second burner, and/or by decreasing the area of the individual nozzles on the second burner. Alternatively, if a single burner is used, the mass flow to selected burner nozzles may be turned off during deposition of the second layer of glass soot. Assuming a total mass flow rate during the deposition of the second layer of glass soot which is at least as large as the mass flow rate during the deposition of the first layer of glass soot, turning off selected burner nozzles may effectively increase the velocity of the burner flame.

Preferably, the velocity of the burner flame during the deposition of a first layer of glass soot is less than about 12 m/s; more preferably less than about 5 m/s. The burner flame velocity during the deposition of additional glass soot overtop the first layer of glass soot, such as, for example, during the deposition of a second layer of glass soot overtop the first layer of glass soot, is preferably greater than about 12 m/s; more preferably at least about 20 m/s.

Figure 5:
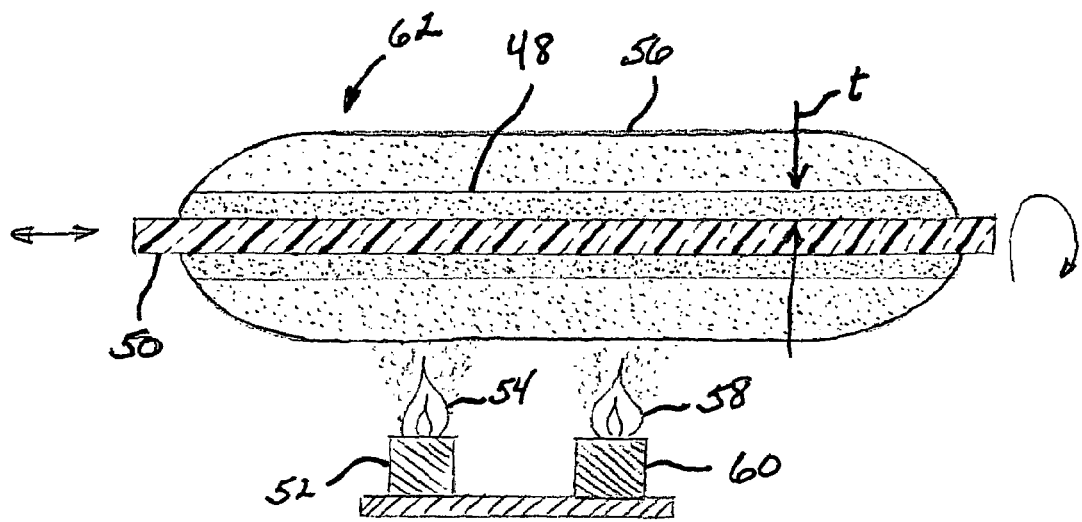
FIG. 5 illustrates a method of depositing soot onto a glass target.
Figure 6:
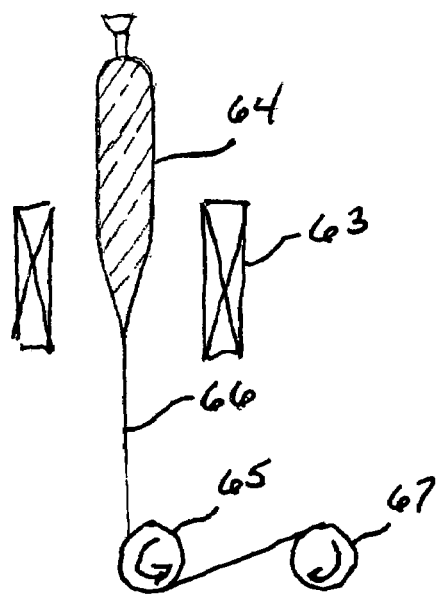
FIG. 6 is an illustration of an optical fiber being drawn from a consolidated optical fiber preform.

In accordance with one embodiment of the invention shown in FIG. 5, a first layer 48 of glass soot is deposited on an optical fiber core cane 50 by first soot depositing burner 52. Burner 52 produces first burner flame 54 having a first flame velocity $v_1$. Preferably, first layer 48 of glass soot has a thickness t less than about 20 mm; more preferably less than about 10 mm. After first layer 48 of glass soot has been deposited on core cane 50, velocity $v_1$ of first burner flame 54 may be increased to deposit second layer 56 of glass soot overtop first layer 48 of glass soot. Overall flame velocity during deposition of second layer 56 of glass soot may be effectively increased by employing a second burner flame 58, such as from second burner 60, having a second flame velocity $v_2$ different from first flame velocity $v_1$. Second flame velocity $v_2$ is preferably greater than first flame velocity $v_1$. For example, first layer 48 of glass soot may be deposited overtop core cane 50 at first flame velocity $v_1$ of less than about 12 m/s; more preferably less than about 5 m/s; and to a thickness of less than about 20 mm; more preferably less than about 10 mm. Second layer 56 of glass soot may thereafter be deposited overtop first layer 48 of glass soot at second flame velocity $v_2$ of at least about 12 m/s; more preferably at least about 20 m/s; and most preferably at least about 30 m/s. First burner flame 54 may be extinguished during deposition of the additional glass by the second burner flame 58, or first burner flame 54 may be continued. Preferably, the temperature at the surface of core cane 50 during deposition of either the first or second layer of glass soot, 48 or 56 respectively, does not exceed about 900K; more preferably, the temperature at the surface of the glass target during deposition of either the first or second layer of glass soot does not exceed about 800K. After the deposition of second layer 56 of glass soot overtop first layer 48, the resultant soot preform 62 may be further processed, such as by drying and consolidating the soot preform in accordance with conventional drying and consolidating techniques as are known in the art. For example, the preform may be heat treated in an atmosphere comprising chlorine to dry soot preform 62, followed by further heating soot preform 62 to consolidate the preform into a solid, clear glass preform 64 as depicted in FIG. 6. The consolidated optical fiber preform 64 may thereafter be drawn into optical fiber 66 by conventional methods, or additional glass may be deposited overtop the consolidated optical fiber preform in accordance with the present invention. Optical fiber preform may be drawn, for example, by arranging optical fiber preform 64 in a furnace such that optical fiber preform 64 is heated by one or more heaters 63. A portion, or gob, of the optical fiber preform softens and drops. A thread of glass which connects the gob to the preform—the optical fiber—is thereafter captured, the gob removed, and the optical fiber pulled by a pulling wheel, or tractor 65, and wound onto a receiving spool 67.

Although the present embodiment is described in terms of a first burner/burner flame to deposit the first layer at velocity $v_1$ and a second burner/burner flame to deposit the second layer at velocity $v_2$, a plurality of burners may be used to practice the embodiment. For example, more than one burner may be used to deposit the first layer of glass soot, each of the burners producing a burner flame having a low flame velocity, such as less than about 12 m/s. In this instance, both burners 52 and 60 would be used to deposit first layer 48 wherein burner flames 54 and 58 would each have a flame velocity less than about 12 m/s. Thereafter, one of, or both, burners 52 and/or burner 60 would be used to deposit second layer 56 of glass soot, wherein burner flame 54 and/or burner flame 58 would have a flame velocity greater than about 12 m/s. In an alternative embodiment, a single burner may be used to deposit first layer 48 at flame velocity $v_1$ less than about 12 m/s, and multiple burners used to thereafter deposit second layer 56 at flame velocity $v_2$ greater than about 12 m/s.

In a preferred embodiment, the velocity $v_1$ of the burner flame 54 may be varied by varying the total mass flow rate of the constituent elements flowing to the burner. The flame velocity may be increased by increasing the total mass flow rate of constituents to the burner flame, or the flame velocity may be decreased by decreasing the total mass flow rate of constituents to the burner flame.

An exemplary outside vapor deposition (OVD) process which may be used to practice the invention is illustrated by FIG. 7 and described in U.S. Pat. No. 4,314,837 to Blankenship, the content of which is incorporated in its entirety herein by reference. It should be understood that although the following describes OVD, other techniques, such as vapor axial deposition (VAD) may be employed. As shown in FIG. 7, a layer of glass soot is applied to substantially cylindrical core cane 50 by flame hydrolysis burner 52. The core cane is rotated and translated with respect to burner 50 so as to build up a generally cylindrical preform 62. For purposes of explanation, FIG. 7 is described in connection with the formation of porous soot blank, or soot preform 62, capable of being drawn into an optical waveguide fiber, although the invention is not necessarily limited to such applications. The cylindrical preform 62 is afterward consolidated into clear glass optical fiber preform 64 and drawn into optical fiber 66 whose characteristics reflect the composition of the reaction product constituents.

The constituents which are ultimately incorporated in the reaction products are maintained in reservoirs 68 and 70 which may be commercially-available pressurized tanks. Reservoirs 68, 70 are provided with heaters 72, 74, respectively, for maintaining the temperature of the reactants sufficiently high to maintain the vapor pressure within the reservoirs at a level sufficient to cause adequate vapor flow through the metering apparatus to the burner. The minimum vapor pressure for accomplishing this purpose is typically 4 psig. The maximum pressure in the reservoirs is dictated by equipment limitations such as the mass flow controller described herein below. Temperature controllers 76 and 78, which maintain the source material in each reservoir at an appropriate temperature, may be selected from commercially available units. Pressure sensors 80 and 82 provide controllers 76, 78, respectively, with controls signals. Accordingly, reservoir pressure is monitored, and the information thus derived is used to control the operation of heaters 72, 74. Appropriate valves 84 and 86 in lines 88 and 90, respectively, are associated with the respective reservoirs for exercising some control over vapor flow if desired, and allow the flow of various vapors to be completely cut off as, for example, for system maintenance or reservoir replacement. Pressure control valves 92 and 94 are provided in lines 88 and 90, respectively, so that the rates of flow of the respective vapors from the reservoirs may be controlled.

In order to more easily operate the system, valves 92 and 94 are of a type which may be controlled electromagnetically or by means of a motor. Accordingly, motors 96 and 98 are illustrated as being coupled to the valves and operated by controllers 100 and 102 to cause the flow of vapors from the reservoirs to vary in a desired manner. Mass flow rate transducers 104 and 106 are disposed in flow sensing relationship with lines 88 and 90, respectively. The signals provided by these transducers are applied to the controllers so that the mass flow rates of the vapors can be controlled. Each combination of a pressure control valve, motor, controller and transducer, for example those elements represented by numerals 92, 96, 100 and 104, is referred to as a mass flow controller. Such controllers are conventionally found in fluid flow systems, and various appropriate types of controllers are readily commercially available. Each of the controllers 100, 102 has a set point input terminal which is connected to the system control unit 106 which may comprise a microprocessor or computer which is programmed to provide each controller with an appropriate control signal.

The vapors flowing from lines 88 and 90 are combined in line 108 which is connected to burner 52. Vapor delivery lines 88, 90 and 108 must be heated to a temperature at least as high as the maximum temperature to which reservoirs 68 and 70 are heated. Oxygen may also be introduced into line 108 from a source 110. The rate of oxygen flow is controlled by a mass flow controller comprising valve 112, motor 114, controller 116 and transducer 118. The flow rate of the oxygen is preferably controlled as a function of the flow rate of the vapor constituents so that an appropriate amount of oxygen is introduced into the system.

While oxygen is needed to form the various oxides which constitute the soot formed in the flame of burner 52, such oxygen may be provided at the burner. A fragmentary cross-sectional view of burner 52 is illustrated in FIG. 8. A centrally located orifice 120 in burner face 44 is surrounded by concentric rings of orifices 122, 124 and 126. The reactant vapors emanate from orifice 120 where they are subjected to heat from a flame produced by the fuel gas and oxygen emanating from orifices 122. A stream of oxygen, referred to as the inner shield, emanates from orifices 124; this stream prevents reaction of the reactant compounds at the burner face. Finally, a stream of oxygen referred to as the outer shield emanates from orifices 126. All of the orifices of burner 52 can be supplied by manifolds.

Referring again to FIG. 7, fuel gas and oxygen, which are supplied to burner 52 by line 128, issue from the burner and are ignited. Additional oxygen may be supplied by line 130. The reactant vapors supplied by line 108 react in the flame to form glass soot which is directed toward preform 62. The chlorine or other material with which the matrix glass precursors and dopant materials had previously been combined is separated from the materials, and combines with hydrogen from the hydrocarbon fuel to form hydrochloric acid. The specific nature of the reaction depends, of course, upon the constituents present and the specific application of the invention. Such reactions themselves form no part of the present invention, and constituents other than those disclosed herein may be used without departing from the thesis of the invention. In addition, still other forms of deposition apparatus such as, for example, apparatus for vapor axial deposition (VAD) or other mechanisms which transfer the matrix glass precursors and dopant materials to a substrate, may be selected for use with the invention. In the present illustration, it will be recognized that in the absence of oxygen as a carrier gas, additional oxygen above and beyond the stoichiometric amount required for combustion of the fuel may be delivered to burner 52, for example, in the manner described in conjunction with FIG. 7.

To employ the illustrated system in the formation of an optical waveguide fiber comprising $SiO_2$ and $GeO_2$, for example, reservoirs 68, 70 may contain $SiCl_4$ and $GeCl_4$, respectively. Of course, many other glass-forming reactants capable of being delivered in vapor form may be employed and each glass forming reactant may be contained within its own reservoir and be controlled by its own mass flow controller. Temperature controllers 76, 78 are adjusted so that the vapor pressure in the respective reservoirs is sufficiently high to permit the vapors to be delivered through the mass flow controllers to the burner.

Valves 84 and 86 are opened and system control 106 provides each of the mass flow controllers with appropriate set point signals so that valves 92 and 94 pass the desired amount of vapor to burner 52. A properly-metered flow of oxygen is also introduced into the burner along with the reactant vapors. The vapors react with oxygen in the flame to form soot which is deposited upon the surface of core cane 50. Soot preform 62 may then heated and consolidated into monolithic glassy blank 64 which can be drawn into optical waveguide 66 in the conventional manner.

In order to radially vary the index of refraction of the waveguide structure, the proportions of the various constituents may be changed in a predetermined manner during the formation of the blank. Accordingly, system control 106 may be caused to produce command signals for various ones of the mass flow controllers at predetermined times so that the amount or kind of dopants are changed. Ordinarily, the change is such as to effect a decrease in the refractive index of the ultimate glass product with increasing preform radius. Accordingly, flow control valves 92 and 94 appropriately regulate the flow of reactant vapors therethrough.

The disclosed type of vapor delivery system is capable of delivering reactant vapors to a deposition apparatus with extremely high accuracy. Accurate control of the temperature and pressure of the liquids in the reservoirs is unnecessary; it is only necessary to maintain the pressure therein sufficiently high so that the vapors can be transported through the mass flow controllers to the burner.

One skilled in the art will realize that, although the preceding descriptions included only a single burner, multiple burners may be employed during the deposition process. It should also be understood that although the foregoing described a vapor delivery system, other delivery systems such as, for example, a liquid delivery system, may also be employed.

In accordance with the embodiment, first layer 48 of glass soot is deposited on core cane 50 such as by the OVD method described supra, at a first total mass flow rate $m_1$. Typically, core cane 50 comprises core glass. Alternatively, core cane 50 may comprise both core glass and at least a portion of the cladding glass which may be incorporated into the final optical fiber. First layer 48 of glass soot may comprise core glass soot, or the first layer of glass soot may comprise cladding glass soot depending upon the composition of the core cane and the desired preform design. Preferably, the temperature of the core cane surface during deposition of first layer 48 of glass soot is less than about 900K (627° C.), more preferably less than about 800K (527° C.). Preferably, first layer 48 of glass soot has a thickness t of at least about 5 mm, more preferably at least about 7 mm, and even more preferably at least about 10 mm. Preferably, first soot layer 48 includes a thickness t of no more than about 20 mm of soot. It is preferable that the first total mass flow rate $m_1$ is maintained constant during deposition of first layer 48 of glass soot. When first layer 48 of glass soot has reached a predetermined thickness, the total flow rate is varied and second layer 56 of glass soot is deposited overtop first layer 48 of glass soot at second total mass flow rate $m_2$. Preferably, second total mass flow rate $m_2$ is greater than first total mass flow rate $m_1$. It is desirable that the stoichiometry of the flame is not changed as the total mass flow rate is varied. That is, it is preferable that the ratios of the constituent elements being flowed to the burner flame are maintained constant while varying the total mass flow rate from the first total mass flow rate $m_1$ to the second total mass flow rate $m_2$.

In another embodiment, the total mass flow rate is varied during the deposition of first layer 48 of glass soot. Because the insulating property of the first layer of glass soot increases as its thickness increases, as thickness t of first layer 48 of glass soot increases, the burner 52 flame velocity may be increased. Preferably, the mass flow rate is continuously increased during the deposition of first layer 48 of glass soot in proportion to the thickness t of first layer 48 of glass soot, although a step-wise increase, or other form of increase is possible and within the scope of the present invention. Preferably, first layer 48 of glass soot has a thickness t of at least about 5 mm, more preferably at least about 7 mm, and even more preferably at least about 10 mm. Preferably, first soot layer 48 includes a thickness of no more than about 20 mm of soot.

After first layer 48 of glass soot has been deposited, the total mass flow rate of reactants flowing to the burner may be increased such that the maximum total mass flow rate $m_2$ during deposition of second layer 56 of glass soot overtop first layer 48 of glass soot is greater than the maximum total mass flow rate $m_1$ of reactants flowing to burner 52 during deposition of first layer 48 of glass soot in order to increase the deposition rate of glass soot. Second layer 56 of glass soot may be additional core glass soot, or second layer 56 of glass soot may be cladding glass soot. Additional layers of glass soot may be deposited as needed, depending upon the design of the optical fiber to be manufactured. Once the final layer of glass soot has been deposited, the optical fiber preform comprising the core cane and one or more layers of glass soot may be dried and consolidated by conventional methods to form solid, clear glass optical fiber preform 64. For example, optical fiber preform 62 may first be heated in the presence of a suitable drying gas, such as chlorine, to remove water from the porous glass soot, after which optical fiber preform 62 may be further heated to sinter, or consolidate the optical fiber preform into solid, clear glass optical fiber preform 64. Preferably, the consolidated optical fiber preform 64 made in accordance with the present invention comprises less than about 0.1 wt.-ppm OH at the interface between the core cane and the first layer. The resultant consolidated optical fiber preform 64 may afterward be drawn by conventional drawing methods to form optical fiber 66. The drawing process preserves the structure of the preform, but on a smaller scale, such that an interface between the core cane and the first layer may still be identified. Preferably, the optical fiber which may be drawn from preform 64 comprises less than about 0.1 wt.-ppm OH at the interface between the core cane and the first layer.

EXAMPLE

A glass core cane comprising core glass was placed in a glass forming lathe and rotated at a rate of 480 rpm. A single burner was supplied with $CH_4$ at a flow rate of 9.187 standard liters per minute (SLPM), $SiCl_4$ at 3.768 SLPM, $O_2$ through a first set of burner nozzles at 4.851 SLPM, $O_2$ through a second set of burner nozzles at 9.022 SLPM, $O_2$ through a third set of nozzles at 8.544 SLPM and $O_2$ through a fourth set of burner nozzles at 7.145 SLPM. The total flow rate to the burner was 42.517 SLPM. The calculated flame velocity was 10.9 m/s. The relative traverse rate between the single burner and the core cane was 7.148 cm/s in a first direction parallel to the longitudinal axis of the core cane, and approximately 45 cm/s in a second, reverse direction. A first layer of glass soot was deposited overtop the glass target rod. The first layer of glass soot had a thickness of approximately 10 mm. A second layer of glass soot was then deposited overtop the first layer of glass soot. The second layer of glass soot having a thickness of 30.42 mm was deposited at an average total mass flow rate of 51.14 SLPM and a burner flame velocity of 13.112 m/s. The relative traverse rates between the preform and the burner were maintained consistent with the traverse rates during deposition of the first layer of glass soot. The resulting soot preform comprising the core cane and the first and second layers of glass soot was dried and consolidated according to conventional techniques, and analyzed for OH concentration by radially sectioning the consolidated preform and measuring the OH concentration as a function of radius using FTIR. The consolidated preform exhibited a peak OH concentration of 0.092 wt.-ppm at the cane-first layer interface.

To evaluate the effects of a faster traverse rate during deposition of the first layer of glass soot, a second core cane having substantially the same diameter as the first core cane and comprising core glass was placed in a glass forming lathe and rotated at a rate of 480 rpm. A single burner was supplied with $CH_4$ at a flow rate of 20.041 SLPM, $SiCl_4$ at 3.768 SLPM, $O_2$ through a first set of burner nozzles at 4.851 SLPM, $O_2$ through a second set of burner nozzles at 9.022 SLPM, $O_2$ through a third set of nozzles at 18.649 SLPM and $O_2$ through a fourth set of burner nozzles at 7.145 SLPM. The total flow rate to the burner was 63.479 SLPM. The calculated flame velocity was 16.273 m/s The relative traverse rate between the single burner and the core cane was 7.148 cm/s in a first direction parallel to the longitudinal axis of the core cane, and approximately 45 cm/s in a second, reverse direction. A first layer of glass soot was deposited overtop the glass target rod. A first layer of glass soot was deposited overtop the core cane. The first layer of glass soot had a thickness of approximately 10 mm. A second layer of glass soot was then deposited overtop the first layer of glass soot. The second layer of glass soot having a thickness of 21.04 mm was deposited at an average total mass flow rate of 58.42 SLPM and a burner flame velocity of 14.976 m/s. The relative traverse rates between the preform and the burner were maintained consistent with the traverse rates during deposition of the first layer of glass soot. The resulting soot preform comprising the core cane and the first and second layers of glass soot was dried and consolidated according to conventional techniques, and analyzed for OH concentration by radially sectioning the consolidated preform and measuring the OH concentration as a function of radius using FTIR. The consolidated preform exhibited a peak OH concentration of 1.089 wt.-ppm at the cane-first layer interface.

What is claimed is:

1. A method of depositing glass soot comprising:
   flowing a fuel and a glass precursor to a burner flame at a total mass flow rate to form a glass soot, the total mass flow rate being a sum of a mass flow rate of the fuel and a mass flow rate of the glass precursors;
   depositing a first layer of the glass soot on a core cane at a first total mass flow rate;
   depositing a second layer of the glass soot overtop the first layer of glass soot at a second total mass flow rate to form an optical fiber precursor; and
   wherein the second total mass flow rate is greater than the first total mass flow rate and a thickness of the first layer of glass soot is less than about 20 mm.

2. The method according to claim 1 wherein the thickness of the first layer of glass soot is less than about 10 mm.

3. The method according to claim 1 wherein a temperature at an interface between the core cane and the first layer of glass soot does not exceed about 900K.

4. The method according to claim 1 wherein a temperature at an interface between the core cane and the first layer of glass soot does not exceed about 800K.

5. The method according to claim 1 wherein the step of depositing the first layer of glass soot comprises varying the total mass flow rate.

6. The method according to claim 5 wherein varying the total mass flow rate comprises increasing the total mass flow rate.

7. The method according to claim 1 further comprising the steps of:
   consolidating the optical fiber precursor to form an optical fiber preform;
   drawing the optical fiber preform into an optical fiber; and
   wherein the optical fiber comprises a peak OH concentration less than about 0.1 wt.-ppm OH at an interface between the core cane and the first layer.

8. A method of forming an optical fiber preform comprising:
   forming a glass soot in a burner flame, the burner flame having a flame velocity;
   depositing a first layer of the glass soot on a core cane at a first flame velocity;
   depositing a second layer of the glass soot overtop the first layer of glass soot at a second flame velocity to form an optical fiber precursor; and
   wherein the second flame velocity is greater than the first flame velocity and a thickness of the first layer of glass soot is less than about 20 mm.

9. The method according to claim 8 wherein a temperature at an interface between the first glass soot layer and the core cane does not exceed about 900K.

10. The method according to claim 8 wherein the first flame velocity is less than about 10 m/s.

11. The method according to claim 10 wherein the first flame velocity is less than about 5 m/s.

12. The method according to claim 8 wherein the second flame velocity is greater than about 10 m/s.

13. The method according to claim 8 wherein the forming step comprises a plurality of burner flames.

14. The method according to claim 13 wherein the plurality of burner flames comprises a first burner flame having the first flame velocity and a second burner flame having the second flame velocity.

15. The method according to claim 8 wherein the step of depositing the second layer of glass soot comprises increasing a total mass flow rate of reactants to the burner flame.

16. The method according to claim 8 further comprising consolidating the optical fiber precursor to form an optical fiber preform comprising an OH concentration less than about 0.1 wt.-ppm at an interface between the core cane and the first layer.

17. An optical fiber formed by the method according to claim 8 comprising an OH concentration less than about 0.1 wt.-ppm at an interface between the core cane and the first layer.

18. A method of making an optical fiber preform comprising:
   providing a core cane comprising core glass;
   flowing a fuel and a glass precursor to a burner flame to form a glass soot;
   depositing a first layer of glass soot on the core cane, wherein the glass soot of the first layer comprises a core glass soot and a velocity of the burner flame during the depositing of the first layer is less than about 5 m/s;
   depositing a second layer of glass soot overtop the first layer of glass soot, wherein the glass soot of the second layer comprises a core glass soot and the velocity of the burner flame during deposition of the second layer of glass soot is greater than about 12 m/s;
   depositing additional layers of glass soot over the second layer of glass soot to form an optical fiber precursor;
   consolidating the optical fiber precursor to form an optical fiber preform; and
   wherein a temperature at a surface of the core cane during deposition of the first or second layer does not exceed a temperature of about 800K and the consolidated optical fiber preform exhibits less than about 0.1 wt. ppm OH at an interface of the core cane.

19. The method according to claim 18 further comprising increasing a mass flow rate of the fuel and glass precursor during the deposition of the first layer of glass soot in proportion to a thickness of the first layer of glass soot.

20. The method according to claim 18 wherein a thickness of the first layer of glass soot is at least about 10 mm and no more than about 20 mm.

* * * * *